Aug. 13, 1929. D. D. GOLDBERG 1,724,079
VALVE MECHANISM
Filed Nov. 8, 1924 3 Sheets-Sheet 1
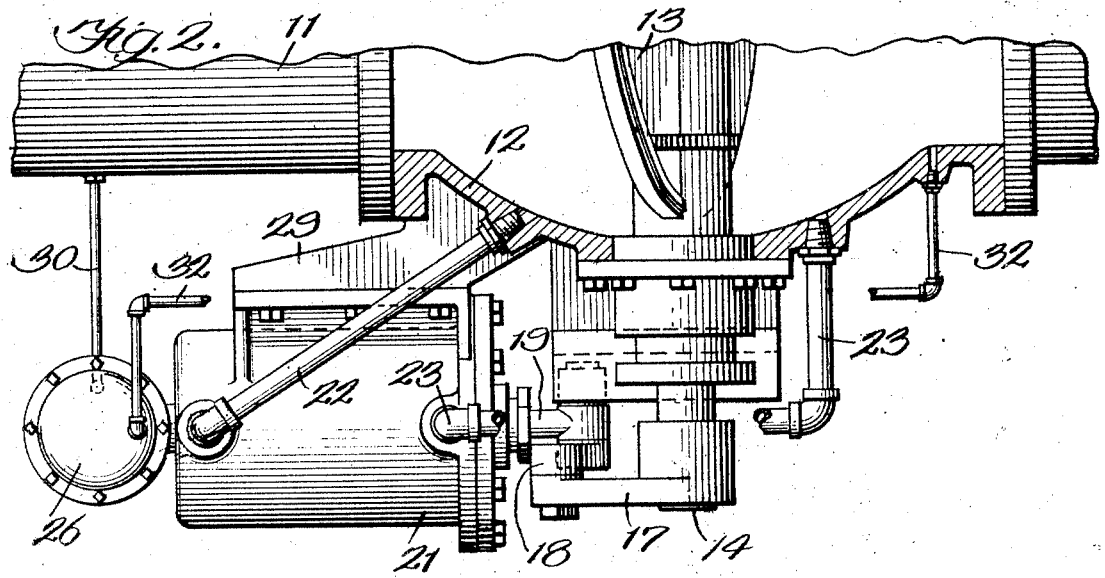
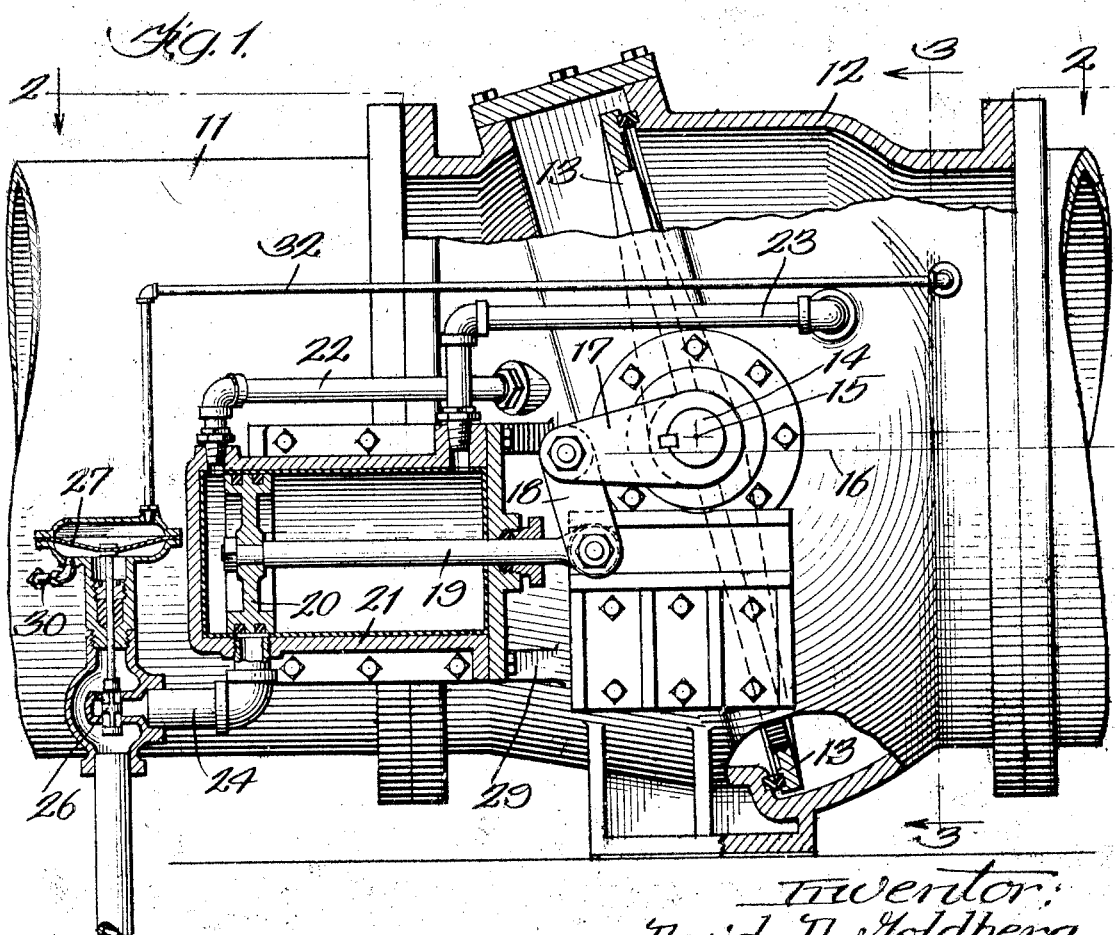
Inventor:
David D. Goldberg
By H. E. Golber Atty.

Aug. 13, 1929.   D. D. GOLDBERG   1,724,079
VALVE MECHANISM
Filed Nov. 8, 1924   3 Sheets-Sheet 2

Inventor:
David D. Goldberg
By H. E. Golbe   Atty.

Aug. 13, 1929.  D. D. GOLDBERG  1,724,079
VALVE MECHANISM
Filed Nov. 8, 1924.  3 Sheets-Sheet 3
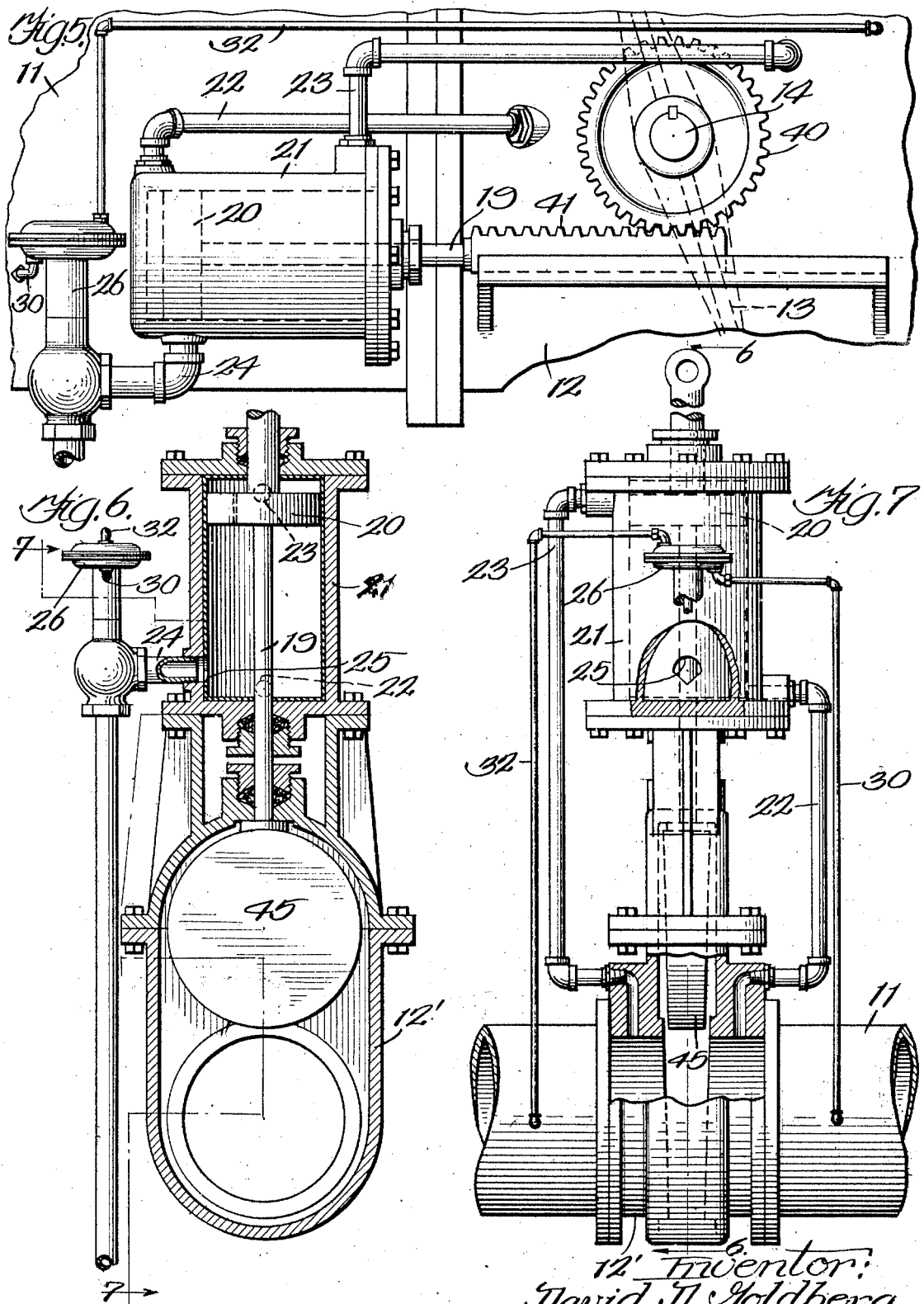
Inventor:
David D. Goldberg
By H. E. Golber Atty.

Patented Aug. 13, 1929.

1,724,079

UNITED STATES PATENT OFFICE.

DAVID D. GOLDBERG, OF CHICAGO, ILLINOIS.

VALVE MECHANISM.

Application filed November 8, 1924. Serial No. 748,631.

In the water works of various cities, there are now used quite a number of centrifugal pumps. These pumps generate a pump pressure larger than the back pressure of the water in the pipes and thus drive the water thru the pipes. It sometimes happens that the centrifugal pump is either, intentionally or accidentally, slowed down or stopped. Its driving pressure is therefore lessened and may become less than the back pressure in the water pipes. When this occurs the back pressure tends to force the water back thru the pump, which is highly undesirable for reasons not necessary to state here. To prevent or rapidly stop such a reversal of flow in the water pipe an unbalanced butterfly valve is often installed in the pipe near the exit of the pump. This valve is forced open by the water and permits its flow whenever the pump pressure exceeds the back pressure; the valve closes as soon as the back pressure exceeds the pump pressure.

It has been found by experience that in order to operate with sufficient speed, the valve must be considerably unbalanced. When the valve closes, it stops with a tremendous bang due to the water pressure behind it. Moreover the familiar phenomenon of "water hammer" due to the sudden stoppage of the water adds to the pressure. The combined result is that the valve stops with a jar that tends to wreck the mechanism and the structure.

To overcome this undesirable effect, the valve was operatively connected with a dash pot in which a liquid was placed and which slowed down the closing movement of the valve. This diminished the jar but slowed down the closing of the valve thus reintroducing an undesirable back flow of the water.

My invention is an improvement on the above mechanism and consists: first, in the removing of the dash pot with its slowing down of the valve closing; second, in reducing the unbalance of the valve to make it practically a balanced valve to thus reduce the shock and increase the ease of opening and closing; third, in providing valve operating mechanism to operate (open or close) the valve independently of the water pressure on the valve itself; and fourth, in providing of controlling means for the valve operating mechanism and itself controlled by the pump pressure and the back pressure in the pipe. When the valve is closed the pump pressure is clearly the pressure at the inlet end of the valve, and the back pressure is the pressure at the outlet end of the valve. The controlling means is therefore itself controlled by the pressure at the inlet and outlet ends of the valve.

Incidentally I find that I have improved the mechanism because the reduction of the unbalance of the valve and the providing of the operating mechanism permits the opening of the butterfly valve further than it would be safe to do if the pressure of the water on the valve itself were relied on to close it. This increased opening of the valve, reduces the blocking of the pipe and decreases the resistance to the free flow of the water, and thus reduces the pumping costs.

My invention is illustrated by three sheets of drawings, forming a part of this specification. In these drawings:

Fig. 1 is an elevation partially in section, of one form of the valve, operating mechanism, and controller.

Fig. 2 shows a plan view of the same mechanism.

Fig. 5 shows a modified construction of the valve operating mechanism.

Figs. 6 and 7 are two views showing my invention applied to a gate valve instead of a butterfly valve.

Figure 3:
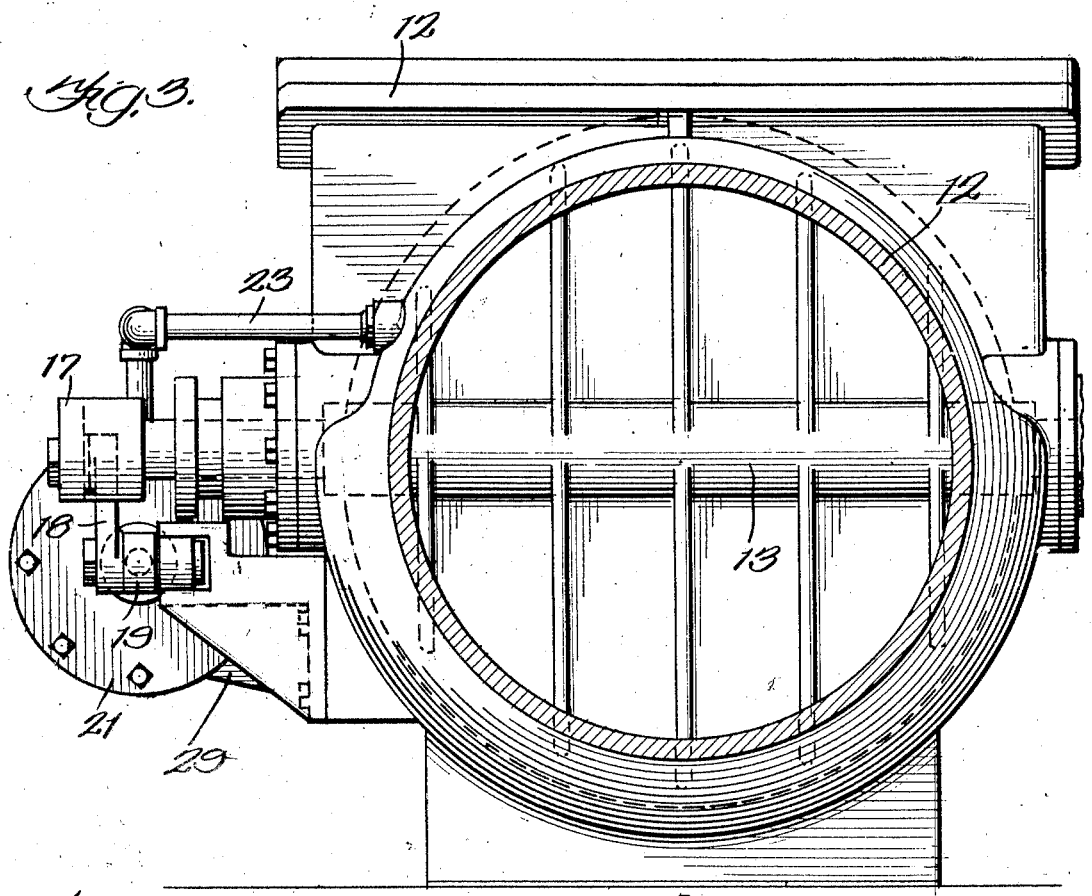
Fig. 3 shows an elevation of the same mechanism looking along the axis of the valve casing.

Referring now to Figs. 1, 2, 3, and 4, the centrifugal pump (shown only in Fig. 4) is numbered 10 and the pipe therefrom 11. This pipe is connected to the casing 12, wherein is mounted the butterfly valve 13, rigidly keyed to its axle 14, extending thru stuffing boxes to the outside of the casing 12. The center of the axle 14 is not quite in the center of the valve 13. In Fig. 1 the center of the axle is shown at 15 while the center of the valve casing and of the valve also is shown by the line 16. The valve is therefore unbalanced, but only slightly so, to take care of contingencies. In the normal operation of the valve the unbalancing is of no effect.

Figure 4:
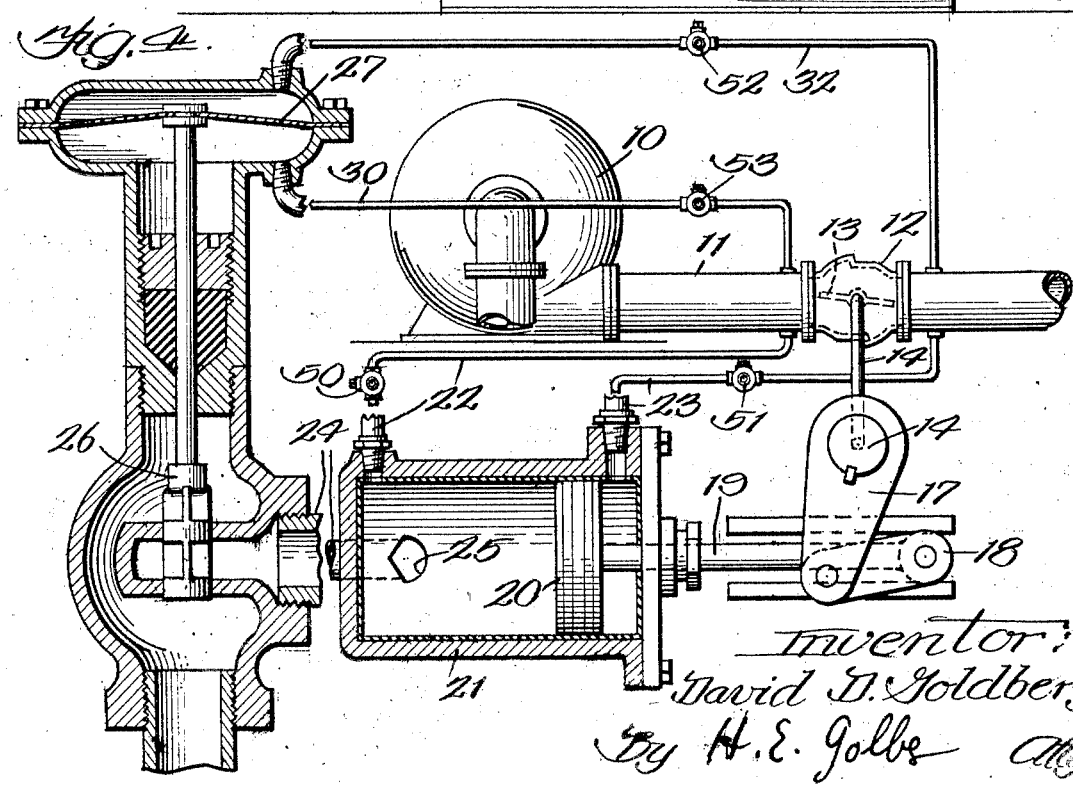
Fig. 4 shows a diagrammatic view of a centrifugal pump, a valve and casing, valve operating mechanism, controller for the operating mechanism, and connections between them.

Rigidly fastened to the axle 14 is an arm 17, connected by a link 18, to a piston rod 19, of a piston 20, slidable in a cylinder 21, mounted on a bracket 29 fastened to the casing 12. The sliding of the piston rod into the cylinder will therefore rotate the axle 14 and close the valve 13 (as shown in Figs. 1, 2, and 3). The sliding of the piston rod out of the cylinder will open the valve (as shown in Fig. 4).

To operate the piston 20, the cylinder 21 has connected thereto two inlet pipes 22 and 23. Of these 22 is connected to the inlet end of the casing, 23 to the outlet end of the casing, with the valve 13 between them. When the casing inlet pressure is the larger the piston opens the valve; when the casing outlet pressure is the larger the piston closes the valve.

With the construction as thus far described, the piston would operate to close the valve or open it, but the efficient force acting on the piston would be only the difference of the pressures on the two sides of it as determined by the pressures at the inlet and outlet of the valve casing. This would be sufficient to operate the mechanism but it would move rather slowly. To speed up the operation I have provided an additional pipe, an outlet pipe 24 which remains normally closed, but is opened to the atmosphere at the proper time, and as it is of larger cross section than the inlet pipe 22, water if any coming from the inlet 22 flows out thru the outlet 24 and thus offers little resistance to the movement of the piston to close the valve, which thus closes very speedily.

The opening and closing of the outlet 24 is controlled thus. The outlet is connected to a controller valve 26 which is operated by the movement of a diaphragm 27 in a chamber 28. When the diaphragm is down as in Fig. 1, the control valve opens the outlet 24; when up as in Fig. 4 the control valve closes the outlet 24. The motion of the control-valve diaphragm is caused by connecting the chamber below the diaphragm by a pipe 30 to the inlet side of the valve casing, and the chamber above the diaphragm, by a pipe 32 to the outlet side of the valve casing. It therefore follows that larger pump pressure tends to close the outlet 24, while larger back pressure opens the outlet 24, which was desired.

The above completes the general description of my invention. Certain refinements passed by above will now be pointed out.

Referring particularly to the kinematic chain composed of axle 14, arm 17, link 18, piston-rod 19 and piston 20, best seen in Figs. 1 and 4, it will be seen that owing to the sizes and locations of the parts, the rod 19 in its in (valve closing) position brings the link 18 nearly to its reversing position. Therefore, in closing the valve, no matter how rapidly the piston rod itself is moved, it nevertheless brings the valve slowly but forcibly into its closed position. The slowing down of the valve at the end of the stroke is very effective in eliminating the bang and "water hammer" mentioned before.

Referring now to the piston 20 and the outlet pipe 24, it will be seen that the outlet is connected not to the end of the cylinder but to its side and its shape is as shown in Fig. 4 at 25. For both of these reasons, the closing movement of the piston gradually decreases the outlet area and gradually slows down the speed of the piston near the end of its stroke, preventing jar in the movement of the operating mechanism.

In practice as installed in the water works of a large city the mechanism has been found to operate very rapidly and quietly, with hardly any noticeable jar in closing the valve.

Certain other forms of the invention will now be considered. Fig. 5 shows how the piston rod can be operatively connected to the valve axle by means of a gear 40 and rack 41.

Figs. 6 and 7 show how my invention can be applied to a gate valve. In these figures the piston rod 19 is directly connected to the valve 45 of the gate valve in the valve casing 12', all intermediate mechanism between them having been eliminated. It is obvious that in this case the valve is symmetrical, there being no structural difference between the inlet and outlet ends of the casing. Nevertheless as connected in the system, the inlet end of the valve casing is the one on the pump side, while the outlet end is the one on the opposite side. In Fig. 7 the inlet is at the right side.

In Fig. 4 there are shown the cocks 50, 51, 52 and 53, installed in the pipes 22, 23, 32 and 30 respectively. These are ordinarily three way cocks, and each is normally kept in a position to permit the flow of the liquid thru it between the two pieces of pipe which it joins. In the functioning of the mechanism as an automatic valve, the cocks do not enter. In practice however, these cocks are installed for contingencies. One use is however of frequent occurrence. It is every now and then required to close the big valve by manual and not automatic control. This is accomplished by turning the three way cock 53 to shut off the pressure from the casing inlet, and simultaneously opening the chamber below the diaphragm 27 to the atmosphere. The back pressure acting thru pipe 32 therefore depresses the diaphragm and opens outlet 24 to the atmosphere. It is of course desirable but not necessary to shut off pipe 22 by cock 50. The back pressure no longer being resisted in the cylinder, moves the piston, and closes the valve.

It is thus possible to use my invention in two ways. Normally it is set to operate automatically but when desired it can be controlled manually. It is obvious that the manual control can similarly be installed in the pipes shown in Figs. 6 and 7, and thus applied to the gate-valve. Thus only one big valve is used both as a check valve against back flow and as a shut off valve. This is pointed out because it is common in water works to install two large valves in series, one large check valve and another large shut off valve. As these large valves are very expensive, the saving by my invention is considerable.

Attention is called to the fact that the water-pipes for operating the piston 20, that is pipes 22 and 23, need not be connected to the valve casing. They might be connected to an independent source of pressure. Where there are a number of such large valves near together, such an installation has certain advantages. The pipes 30 and 32 however must be connected to the casing inlet and outlet respectively, and cannot be connected to an independent source.

While I have shown my invention as applied to a waterworks system, it is obvious that it can easily be applied to industrial pumping systems. It has however other applications. For instance in a steam plant where several boilers furnish steam into a common pipe or header, the installation of my mechanism between a boiler and the header would prevent a back flow of the steam into that boiler, should the pressure therein fall; which is highly desirable.

In view of the applicability of my invention both to water and steam, that is to both liquids and gases, the invention is described as applying to fluid distributing systems.

There are now on the market, waterwork valves operated by electric motors, which motors are governed by an electric switch which need only be pushed one way to start the motor to open the valve and another way to start the motor to close the valve. It is obvious, that by operatively connecting the electric switch with the diaphragm of the control valve the fluid pressure in the two ends of the controller valve casing will govern the chain of parts composed of the diaphragm, the switch, the motor, and the valve. The big valve would thus be opened or closed automatically.

The drawings show the two tubes 30 and 32 to the controller at right angles to the pipe. They thus register merely the static head. If however pipe 30 be bent inside of the large pipe to face upstream that is toward the pump and the pipe 32 be bent inside the pipe to face downstream, then they become "Pitot tubes" now registering the "flowhead." The difference between the pressures in pipes 30 and 32 will now be larger than the difference between the static heads and the mechanism will function more delicately.

In the claims below I use the terms casing inlet and casing outlet. By the term "casing inlet" I mean any part of the pipe between the pump and the valve; by the term "casing outlet" I mean any part of the pipe not between the pump and the valve. The two terms are therefore not limited to the parts of the pipe immediately adjacent to the valve.

The drawings show the controller with a flexible diaphragm, which is ordinarily made of rubber canvas, but may be made of metal. In fact, no diaphragm is necessary, as it may be substituted by a piston, if so desired.

Having now fully described my invention, I claim:

1. In a fluid distributing system: a casing; a valve therein; a cylinder and piston for operating the valve, the cylinder being provided with two inlets and one outlet, one inlet to drive the piston to open the valve, the other inlet to drive the piston to close the valve, the outlet for opening the first inlet to the atmosphere; and controlling means opening and closing the outlet and itself controlled by the pressure at the two ends of the casing.

2. In a fluid distributing system: a casing; a valve therein; a cylinder and piston for operating the valve, the cylinder being provided with two inlets and one outlet, one inlet to drive the piston to open the valve, the other inlet to drive the piston to close the valve, the outlet for opening the first inlet to the atmosphere; and controlling means opening and closing the outlet and itself controlled by the pressure at the two ends of the casing, and opening the cylinder outlet when the pressure at the casing outlet is the larger, and closing the cylinder outlet when the pressure at the casing inlet is the larger.

3. In a hydraulic system, the combination with a valve casing, of a main valve movable therein, a cylinder, a piston in the cylinder, piping connections from the pressure side of the valve to a port in one end of the cylinder, piping connections from the other side of the valve to a port in the other end of the cylinder, connections between the valve and the piston so that as the valve opens the piston moves toward the first mentioned end and vice versa, and a third port from the cylinder near said first mentioned end controlled by a differential valve connected to the two sides of the main valve so that as the pressure is reduced on the pressure side the differential valve acts to open the third port to discharge the contents of the cylinder there-through without said contents passing through either of the other cylinder ports.

In testimony whereof I have signed my name to this specification this 30th day of Oct., 1924, at Chicago, Illinois.

DAVID D. GOLDBERG.